(12) United States Patent
Hartfelder et al.

(10) Patent No.: US 7,971,523 B2
(45) Date of Patent: Jul. 5, 2011

(54) REMOVABLE DIVIDER FOR FOOD WARMING APPARATUS

(75) Inventors: Charles Hartfelder, Carol Stream, IL (US); Loren J. Veltrop, Chicago, IL (US); Richard L. Thorne, Elgin, IL (US); Jack Guasta, Glendale Heights, IL (US)

(73) Assignee: Prince Castle, Inc., Carol Stream, IL (US)

( * ) Notice: Subject to any disclaimer, the term of this patent is extended or adjusted under 35 U.S.C. 154(b) by 860 days.

(21) Appl. No.: 11/941,040

(22) Filed: Nov. 15, 2007

(65) Prior Publication Data
US 2009/0126580 A1 May 21, 2009

(51) Int. Cl.
*A47J 37/00* (2006.01)
*A47J 27/00* (2006.01)
*A23L 1/00* (2006.01)

(52) U.S. Cl. ............... 99/448; 99/467; 99/483; 426/418

(58) Field of Classification Search ............... 99/448, 99/483, 468, 467; 426/418, 520; 219/399, 219/394, 386, 385
See application file for complete search history.

(56) References Cited

U.S. PATENT DOCUMENTS

| | | | |
|---|---|---|---|
| 6,116,154 A * | 9/2000 | Vaseloff | 99/483 |
| 6,878,391 B2 * | 4/2005 | Veltrop | 426/418 |
| 7,089,850 B2 * | 8/2006 | Lee et al. | 99/468 |
| RE40,290 E * | 5/2008 | Shei et al. | 219/399 |
| 2004/0069155 A1 * | 4/2004 | Shei | 99/448 |

* cited by examiner

*Primary Examiner* — Reginald L Alexander
(74) *Attorney, Agent, or Firm* — McDonnell Boehnen Hulbert & Berghoff LLP

(57) ABSTRACT

A food warming apparatus includes a cabinet with one or more heating compartments for holding one or more trays. Each tray has a rim extending outwardly from a tray opening and may contain previously cooked food portions. One or more dividers are removably mounted inside a heating compartment, dividing the heating compartment into a first sub-compartment and second sub-compartment. The one or more dividers include a first support flange that extends into the first sub-compartment and a second support flange that extends into the second sub-compartment. The first support flange supports a rim of a first tray in the first sub-compartment such that the first tray is suspended above a lower compartment surface of the heating compartment. The second support flange supports a rim of a second tray in the second sub-compartment such that the second tray is suspended above the lower compartment surface of the heating compartment.

20 Claims, 9 Drawing Sheets

REMOVABLE DIVIDER FOR FOOD WARMING APPARATUS

BACKGROUND OF THE INVENTION

1. Field of the Invention

This invention relates to the field of food preparation. More particularly, this invention relates to an apparatus and method for maintaining food in a ready to use condition in which previously cooked food portions are contained in trays stored within a food warming apparatus divided into sub-compartments with a removable divider.

2. Description of Related Art

In many establishments, such as fast food restaurants, certain food items are cooked well in advance of when they are ordered by or served to the customer. Examples of such food items can include sandwich fillings, such as cooked eggs, hamburger patties, breaded foods, such as chicken nuggets, or balked goods, such as muffins. These previously cooked food portions are often maintained in a ready-to-use condition until they served to the customer. This typically involves maintaining the previously cooked food portions at a serving temperature in the range of from about 140° F. to about 200° F., depending on the food item.

Various food warming apparatus have been developed to maintain previously cooked food portions at a desired serving temperature. Such food warming apparatus are sometimes referred to as staging cabinets, holding cabinets, or warming cabinets. Some of the challenges involved in designing a food warming apparatus involve increasing the safety of the apparatus and reducing spillage while maintaining a speedy workflow within the restaurant. The challenge can be particularly great when trays of different sizes (e.g. heights and/or widths) are used to hold previously cooked food portions.

One commonly used way to protect previously cooked food items for which drying out is a concern, is to place the food items in a container, such as a tray, and to provide a cover for the container. The cover restricts evaporation of moisture from the previously cooked food items. With a reduced amount of moisture vapor being able to escape from the covered container, the previously cooked food items contained therein do not dry out as rapidly.

Conventional covers are inconvenient to use in food fast restaurants and similar establishments. This is because when previously cooked food portions are taken from the food warming apparatus, the cover typically must be removed from the tray to gain access to the food items contained therein, and must be replaced to protect the remaining food portions contained in the tray. The steps of removing and replacing a cover can take an amount of time that is unacceptably large in fast food restaurants. The removed cover can also become misplaced or contaminated and can get in the way of other activities in the kitchen area.

SUMMARY

In a first principal aspect, an exemplary embodiment provides a food warming apparatus for maintaining previously cooked food portions contained in a plurality of trays in a ready-to-use condition. The plurality of trays include a first tray and a second tray. The first tray has a first rim extending outwardly from a first tray opening. The second tray has a second rim extending outwardly from a second tray opening. The food warming apparatus comprises a cabinet with at least one heating compartment therein. The at least one heating compartment has an upper compartment surface, a lower compartment surface, a first side-wall, and a second side-wall. At least one divider is removably mounted in the at least one heating compartment. The at least one divider divides the at least one heating compartment into at least a first sub-compartment and a second sub-compartment. A first support flange is disposed on the at least one divider for supporting the first rim of the first tray in the first sub-compartment such that the first tray is suspended above the lower compartment surface. A second support flange is disposed on the at least one divider for supporting the second rim of the second tray in the second sub-compartment such that the second tray is suspended above the lower compartment surface.

In a second principal aspect, an exemplary embodiment provides a method for using a plurality of trays in a food warming apparatus. The plurality of trays include a first tray and a second tray. The first tray has a first rim extending outwardly from a first tray opening. The second tray has a second rim extending outwardly from a second tray opening. The food warming apparatus comprises a cabinet with at least one heating compartment therein. The at least one heating compartment has an upper compartment surface and a lower compartment surface. In accordance with the method, a divider is removably mounted inside the heating compartment such that the heating compartment is divided into at least a first sub-compartment and a second sub-compartment. The divider includes a first support flange that extends into the first sub-compartment and a second support flange that extends into the second sub-compartment. A first tray is inserted into the first sub-compartment such that the first rim is supported by the first support flange and the first tray is suspended above the lower compartment surface. A second tray is inserted into the second sub-compartment such that the second rim is supported by the second support flange and the second tray is suspended above the lower compartment surface.

DETAILED DESCRIPTION OF EXEMPLARY EMBODIMENTS

1. Overview

Figure 1:
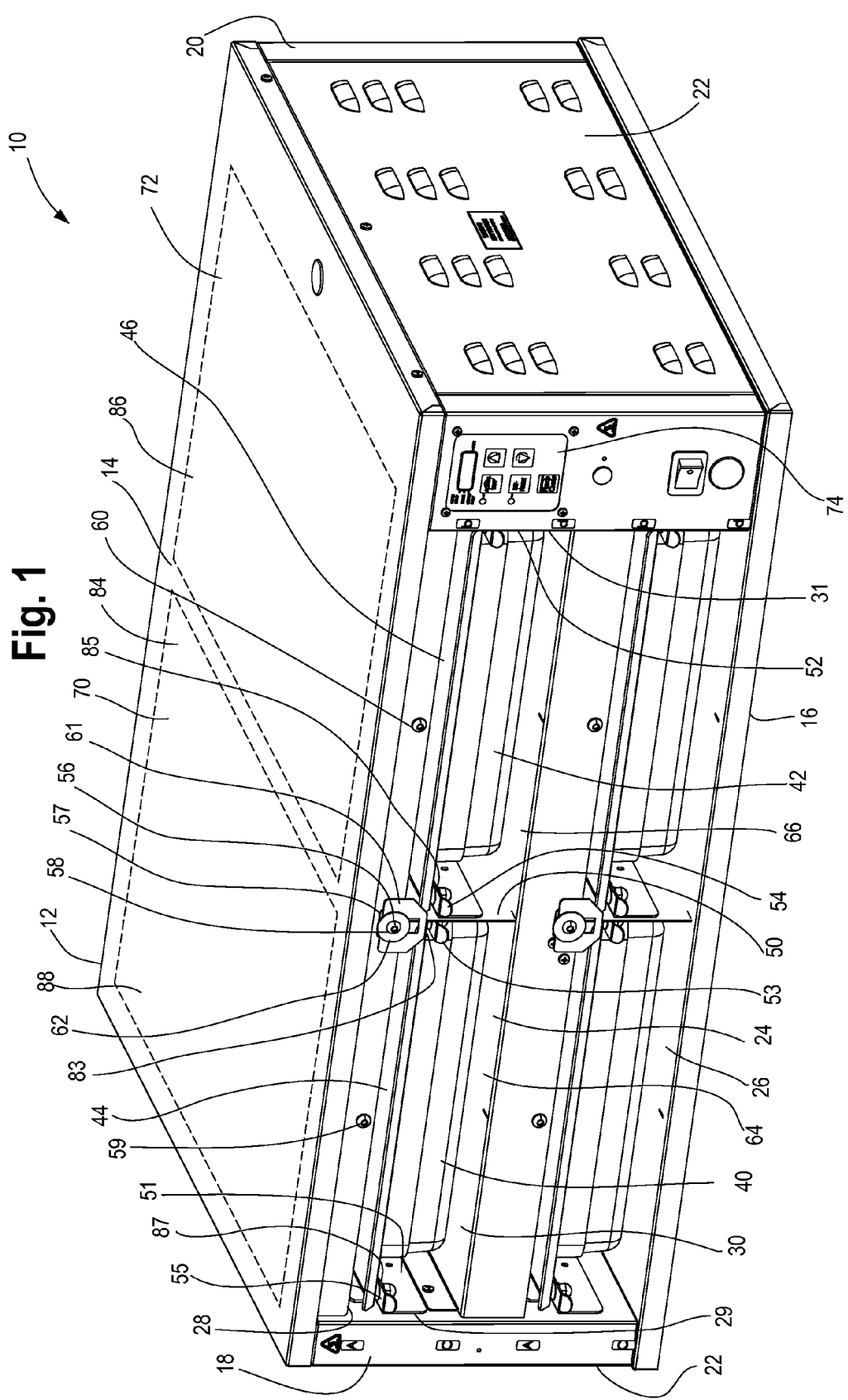
FIG. 1 is an isometric view of a food warming apparatus with one single-level divider installed in each heating compartment and a tray supported within each sub-compartment, in accordance with an exemplary embodiment.

A food warming apparatus is able to maintain previously cooked food portions in a ready-to-use condition. A food warming apparatus may have a cabinet that has one or more heating compartments therein. The previously cooked food portions may be placed in one or more open-top containers, which are referred to herein as "trays." The trays containing the previously cooked food portions may be placed in the heating compartments to maintain the portions at a desired temperature.

The trays used with a food warming apparatus may be of different sizes with varying heights, widths, and/or lengths. For example, a heating compartment may hold a tray whose height is nearly that of the heating compartment. Alternatively, a heating compartment may hold a "shallow tray" whose height is much less than that of the heating compartment. Although the sizes of trays may differ, each tray preferably has an open top, i.e., a "tray opening," and a rim that extends outwardly from the tray opening.

One or more dividers may be removably mounted in a heating compartment to divide the heating compartment into sub-compartments. The cabinet may be configured with one or more fixed mounting points to permit dividers to be removably mounted in different positions in a heating compartment. In this way, the dividers may be used to define sub-compartments of varying widths. For example, a heating compartment may have two, unequally sized sub-compartments to hold trays of different widths in the same heating compartment.

A divider may have one or more support flanges to support trays above the lower surface of the heating compartment. A divider could be a "single-level divider" with one support flange per side of the divider. Alternatively, a divider could be a "multi-level divider" that has more than one support flange per side of the divider. Thus, a multi-level divider may be capable of supporting trays of different heights in a sub-compartment.

A tray containing previously cooked food portions may be placed in the heating compartment by inserting it into a sub-compartment defined by one or more dividers. One or more support flanges on the one or more dividers may support the rim of the tray so that the tray is suspended above the lower compartment surface. One or more complementary support flanges may support the rim of the tray in cooperation with the support flanges. For example, a support flange on a divider may support the rim on one side of the tray opening and a complementary support flange may support the rim on the opposite side of the tray opening. The complementary support flange could be disposed on another divider. Alternatively, the complementary support flange could be disposed on a side-wall of the heating compartment or disposed in the heating compartment in some other manner. A complementary support flange could be disposed on either a "single-level" or "multi-level" complementary support.

The tray may be inserted into the sub-compartment until it reaches an internal position, for example, a position where the tray is centered or nearly centered within the heating compartment. The internal position may be defined by the positions of one or more protrusions on a support flange and/or one or more protrusions on a complementary support flange. For example, as a user of the food warming apparatus inserts a tray into a sub-compartment defined by one or more dividers, the rim of the tray may encounter a first protrusion on a support flange and a first protrusion on a complementary support flange, thereby increasing the force required to move the tray. The user may continue to insert the tray beyond this point until the rim clears the first protrusions, which the user may sense as a decrease in the force required to move the tray. However, with additional insertion, the rim may encounter a second protrusion on the support flange and a second protrusion on the complementary support flange, thereby again increasing the force required to move the tray. Thus, the user may sense the internal position as a preferred position in which the rim is between the first protrusions and the second protrusions.

The support flanges of the divider, the complementary support flanges of the complementary support, or the support flanges in cooperation with the complementary support flanges, may also support a cover for the tray. The cover may at least partially block the tray opening to restrict evaporation of liquid from previously cooked food portions contained in the tray. The cover may be fashioned with one or more turned-up edges. The one or more turned-up edges may function as engagement edges that engage a stop member mounted on the cabinet to retain the cover within the heating compartment.

When a tray is fully inserted into the sub-compartment, the tray may come to rest in the internal position. While being inserted, the tray may lift the cover from a resting position on the one or more support flanges and/or the one or more complementary support flanges to a position where the cover is supported on the rim of the tray. When the tray is withdrawn from a sub-compartment, the cover may move along with the tray. However, the one or more stop members may engage the one or more engagement edges of the cover, thereby asserting the motion of the cover and ensuring the cover stays within the sub-compartment.

Configuring the covers so that they stay in the heating compartment can provide benefits for establishments such as fast food restaurants. In particular, a tray containing previously cooked food portions may be inserted into the heating compartment and covered in one step, and the tray may be withdrawn from the heating compartment and uncovered in one step, thereby saving time. In addition, the inconvenience and the possibilities of contamination associated with direct handling of covers can be reduced.

2. Exemplary Food Warming Apparatus

With reference to FIG. 1, an exemplary food warming apparatus 10 includes a housing or cabinet 12 that has a top 14, a bottom 16, a front 18, a back 20, and sides 22. The interior of cabinet 12 is divided into heating compartments 24 and 26. Although FIG. 1 shows exemplary food warming apparatus 10 with two heating compartments, it is to be understood that a food warming apparatus could be provided with a greater or fewer number of heating compartments.

In the example shown in FIG. 1, front 18 is open to provide access to heating compartments 24 and 26. However, it is to be understood that back 20 could also be open to provide access to heating compartments 24 and 26; for example, in a pass-through configuration. Each of heating compartments 24 and 26 includes an upper compartment surface, a lower compartment surface, and first and second side-walls. Thus, heating compartment 24 includes upper compartment surface 28, first side-wall 29, lower compartment surface 30, and second side-wall 31, as shown in FIG. 1. Compartment 26 may be similarly configured.

Each of heating compartments 24 and 26 is sized to accommodate a plurality of trays, as exemplified in FIG. 1 by trays 40 and 42 in heating compartment 24. Each of trays 40 and 42 are covered by covers 44 and 46, respectively. Although FIG. 1 shows two trays in each compartment, it is to be understood that the compartments may be sized to accommodate a greater or fewer number of trays. In addition, although FIG. 1 shows each compartment filled with its maximum number of trays, it is to be understood that a compartment might hold less than the maximum number of trays at any given time.

Trays may be supported in a variety of ways. Trays may be supported by a support structure such as a divider and a complementary support. For example, FIG. 1 shows tray 40 in heating compartment 24 supported by a divider 50 and a complementary support 51 and tray 42 in heating compartment 24 supported by divider 50 and complementary support 52. A single-level divider may have one or more support flanges, with one support flange per side of the divider. Single-level divider 50 is illustrated in FIG. 1 with first support flange 53 and second support flange 54, with first support flange 53 on the left side of divider 50, and second support flange 54 on the right side of single-level divider 50. A complementary support may have one or more complementary support flanges. FIG. 1 shows complementary support 51 with a complementary support flange 55.

Figure 2:
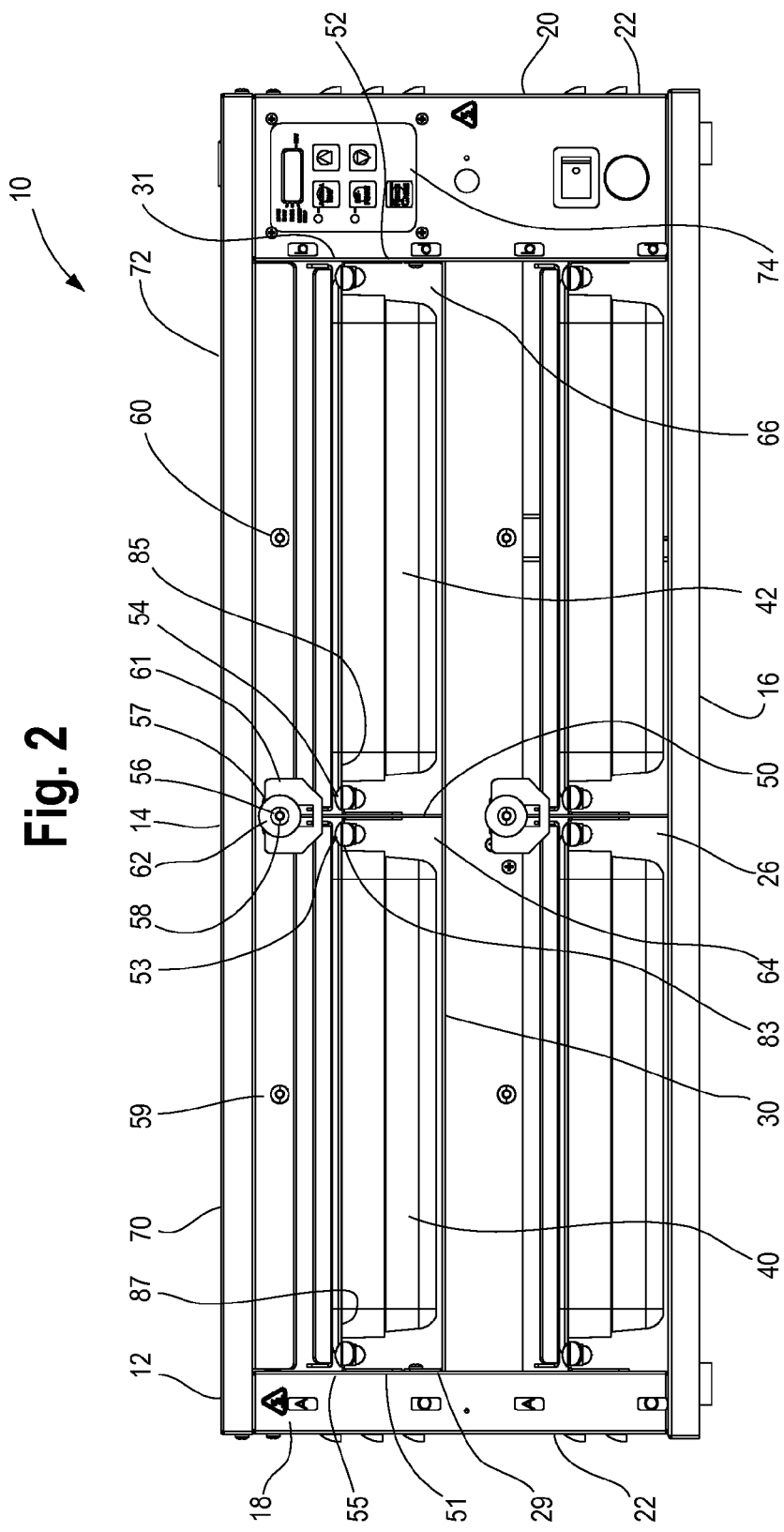
FIG. 2 is a front view of a food warming apparatus with one single-level divider installed in each heating compartment and a tray supported within each sub-compartment, in accordance with an exemplary embodiment.

A support flange of a divider may support a tray so it is suspended above the lower compartment surface. A complementary support flange of a complementary support may support a tray in this way in cooperation with the support flange on a divider. As best seen in FIG. 2, tray 40 is suspended above lower compartment surface 30 by first support flange 53 on single-level divider 50 and complementary support flange 55 on complementary support 52. FIG. 2 also shows tray 42 supported above lower compartment surface 30 by second support flange 54 of single-level divider 40 and by a complementary support flange on complementary support 52. Alternatively, a tray may also be supported from below by resting on a support structure, such as a rack, or by resting on the lower compartment surface.

Complementary supports and dividers may be mounted inside the heating compartment in various ways. A complementary support may be mounted on the upper compartment surface, the lower compartment surface, or a side of the heating compartment. FIG. 1 shows complementary support 51 mounted on first side-wall 29 of heating compartment 24 and complementary support 52 mounted on second side-wall 31 of heating compartment 24.

Figure 6:
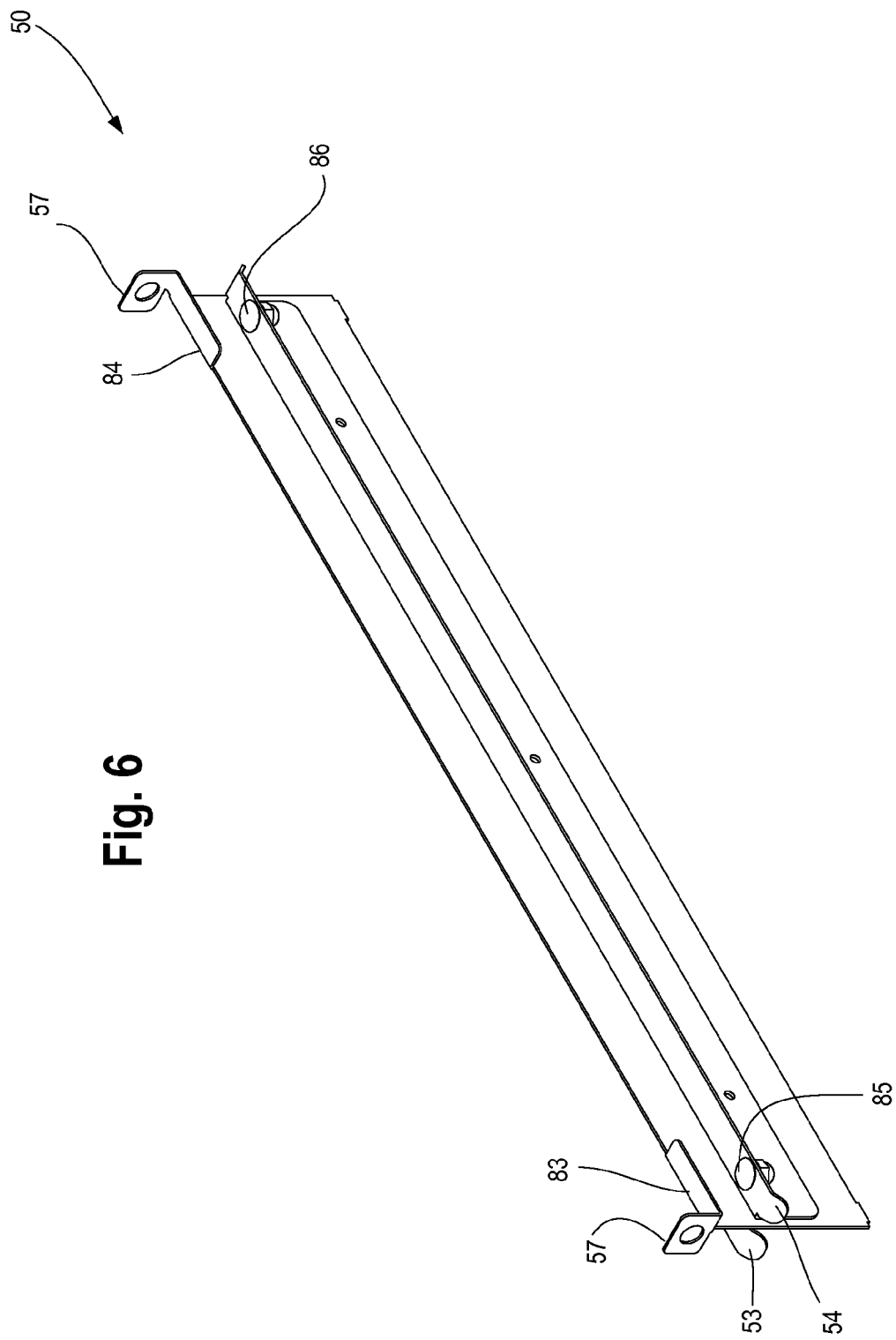
FIG. 6 is an isometric view of a single-level divider, in accordance with an exemplary embodiment.

The cabinet may be configured with one or more fixed mounting points. As best seen in FIGS. 1 and 2, cabinet 12 is configured with fixed mounting points 58, 59, and 60, although it may be appreciated that a greater or smaller number of mounting points may be used. The divider may be removably mounted in the heating compartment in various ways. A divider could be removably mounted using a mounting fastener, such as a bolt, screw or other fastener, passing through both a mount on the divider and through a hole at one or more fixed mounting points on the cabinet. As best illustrated in FIG. 6, divider 50 has two mounts 57 that receive a mounting fastener. Alternatively, a divider may be removably mounted to either of the lower or upper compartment surfaces.

Figure 9:
FIG. 9 is an isometric view of one tray and one cover within a food warming apparatus, in accordance with an exemplary embodiment.

In the example best illustrated in FIG. 9, divider 50 is mounted inside heating compartment 24 by passing mounting fastener 56 through both mount 57 of divider 50 and a hole at fixed mounting point 58 in cabinet 12 and then by securing mounting fastener 56 to cabinet 12. A stop member may also be removably mounted at one or more fixed mounting points on the cabinet. Either the stop member or the mount of the divider may protected by a washer, gasket or similar protecting device. As best seen in FIG. 9, stop member 61 is mounted at fixed mounting point 58 and is protected by washer 62.

The cabinet could be fashioned with a mounting protrusion for hanging the mount on the divider without use of a fixed mounting member. As another alternative, a divider may be removably mounted in an adjustable fashion, such as by being mounted using a mounting member in a similar fashion as described above, except that the fixed mounting point would be replaced with a slot, slit, groove, or any similar opening allowing the divider to be mounted at any position along the slot by passing a mounting member through both the mount in the divider and the slot and temporarily affix the mounting member to the cabinet.

Each of heating compartments 24 and 26 may be heated by a respective heating system. In an exemplary embodiment, each heating system includes one or more resistive heaters for heating its respective compartment from above and/or from below. For example, FIG. 1 shows heating compartment 24 may be heated through upper compartment surface 28 by heater plates 70 and 72, which may be positioned over trays 40 and 42, respectively. Heating compartment 24 may also be heated through lower compartment surface 30 by similar heater plates. Heating compartment 26 may be heated in a similar manner.

Food warming apparatus 10 may include various controls for enabling an operator to control its operation and various indicators for displaying information to the operator. Some of the controls and indicators may be arranged in a control panel 74 disposed on front 18. Control panel 74 may enable the operator to select setpoint temperatures for the compartment (or for specific trays in the compartments). A control system in food warming apparatus 10 may control the heating systems for the compartments (e.g., thermostatically) to achieve and maintain the setpoint temperatures. In an exemplary embodiment, the control system may measure the temperature at the heating system (e.g., at heater plate 70 or 72), so that the setpoint temperature corresponds to the temperature at the heating system. The temperature of the food inside of the covered tray in the compartment may be lower than the setpoint temperature. For example, it may be desirable to maintain previously cooked food portions at a temperature that may range from about 140° F. to about 200° F. To achieve this food temperature, the setpoint temperature may need to be as high as 400° F.

Figure 3:
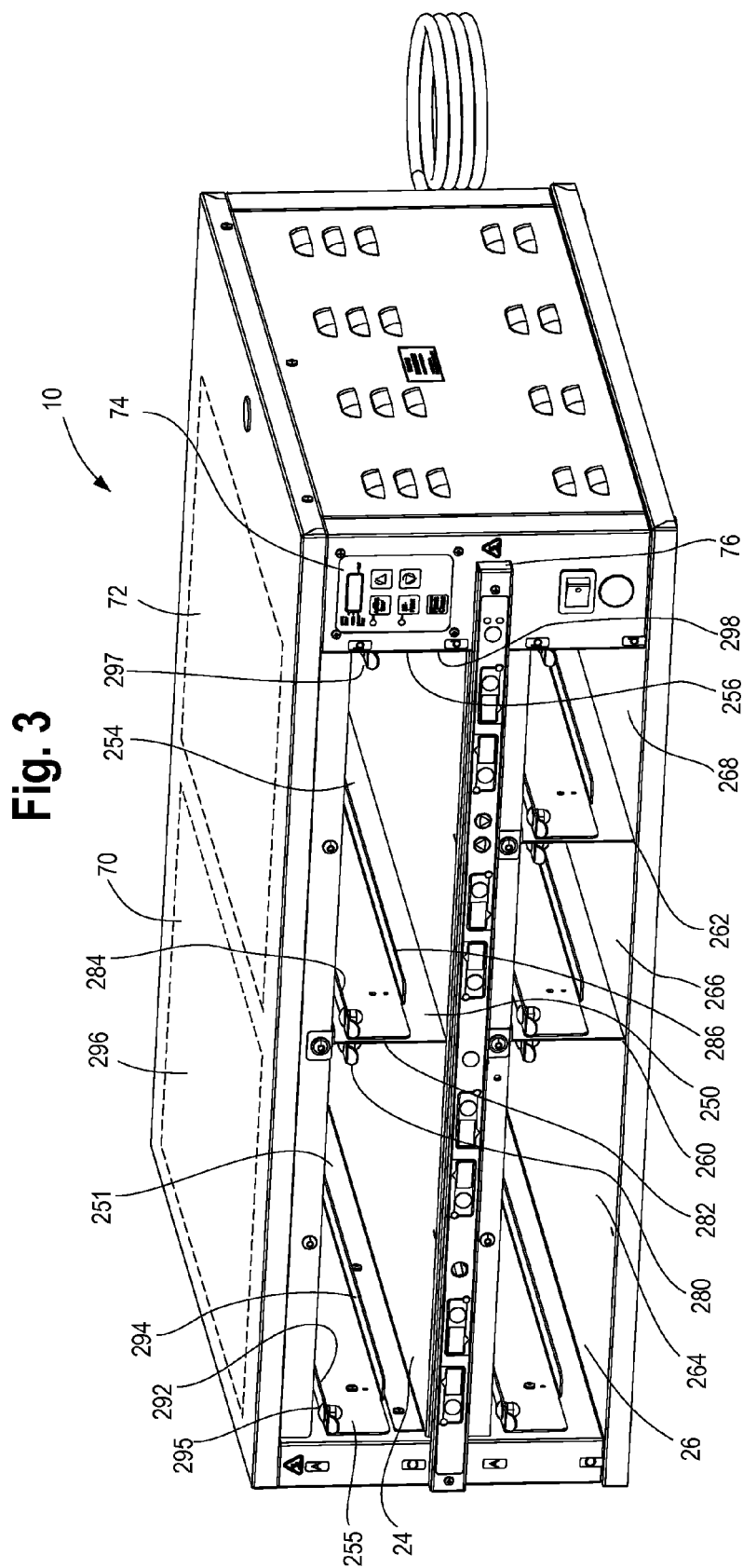
FIG. 3 is an isometric view of a food warming apparatus without trays with one multi-level divider installed in the upper heating compartment and two multi-level dividers installed in the lower heating compartment, in accordance with an exemplary embodiment.

Other controls and indicators may be arranged in on interface bar 76, as shown in FIG. 3. Interface bar 76 may each enable an operator to select a hold time for the respective compartment (or for a specific tray in the compartment) based, for example, on the particular food product contained in the compartment (or contained in a specific tray in the compartment). The operator may select the hold time by scrolling through a list of food products, each of which has been associated with a preset hold time. A display on the interface bar may display descriptions of the food products as the operator scrolls through the list and may then display a description of the selected food product.

When the selected food product is placed in the compartment, the operator may interact with the compartment's interface bar to start a timer. When the hold time has been reached, the compartment's interface bar may provide an indication to the operator. The operator may then replace the food product with fresh food product and interact with the interface bar to re-set the timer.

One or more dividers removably mounted in a heating compartment may separate a heating compartment into sub-compartments. For example, one divider may divide or separate a heating compartment into two sub-compartments. FIG. 3 shows divider 250 removably mounted in heating compartment 24, dividing heating compartment 24 into a first sub-compartment 251 and a second sub-compartment 254. More generally, if a number N of dividers are removably mounted within a heating compartment, then the N dividers divide the heating compartment into N+1 sub-compartments. FIG. 3 also shows two dividers 260 and 262 removably mounted in heating compartment 26 dividing heating compartment 26 into three sub-compartments 264, 266, and 268. The sub-compartments may be of equal or unequal sizes. FIG. 3 shows equally sized sub-compartments 251 and 254 and shows sub-compartment 264 as wider than either sub-compartment 266 or 268.

Dividers 250, 260, and 262 are multi-level dividers. A multi-level divider may have more than one flange on one side of the divider. As shown in FIG. 3, multi-level divider 250 has a first upper support flange 280 and a first lower support flange 282 on the left side of multi-level divider 250 and a second upper support flange 284 and a second lower support flange 286 on the right side of multi-level divider 250. The support flanges of multi-level dividers may extend into the sub-compartments. First upper support flange 280 and first lower support flange 282 extend into sub-compartment 251 and second upper support flange 284 and second lower support flange 286 extend into sub-compartment 254. Note that the first and second lower support flanges are below the first and second upper support flanges, respectively.

Complementary supports may have upper and lower support flanges as well. FIG. 3 shows complementary support 255 with upper complementary support flange 292 and lower complementary support flange 294 and complementary support 256 with upper complementary support flange 297 and lower complementary support flange 298. Complementary supports may be fashioned with one or more protrusions on one or more complementary support flanges. FIG. 3 illustrates complementary support 255 fashioned with protrusions 295 and 296 on upper complementary support flange 292. A protrusion may be any bump, bulge, post, knob, ridge, or similar projection on the complementary support flange.

Figure 4:
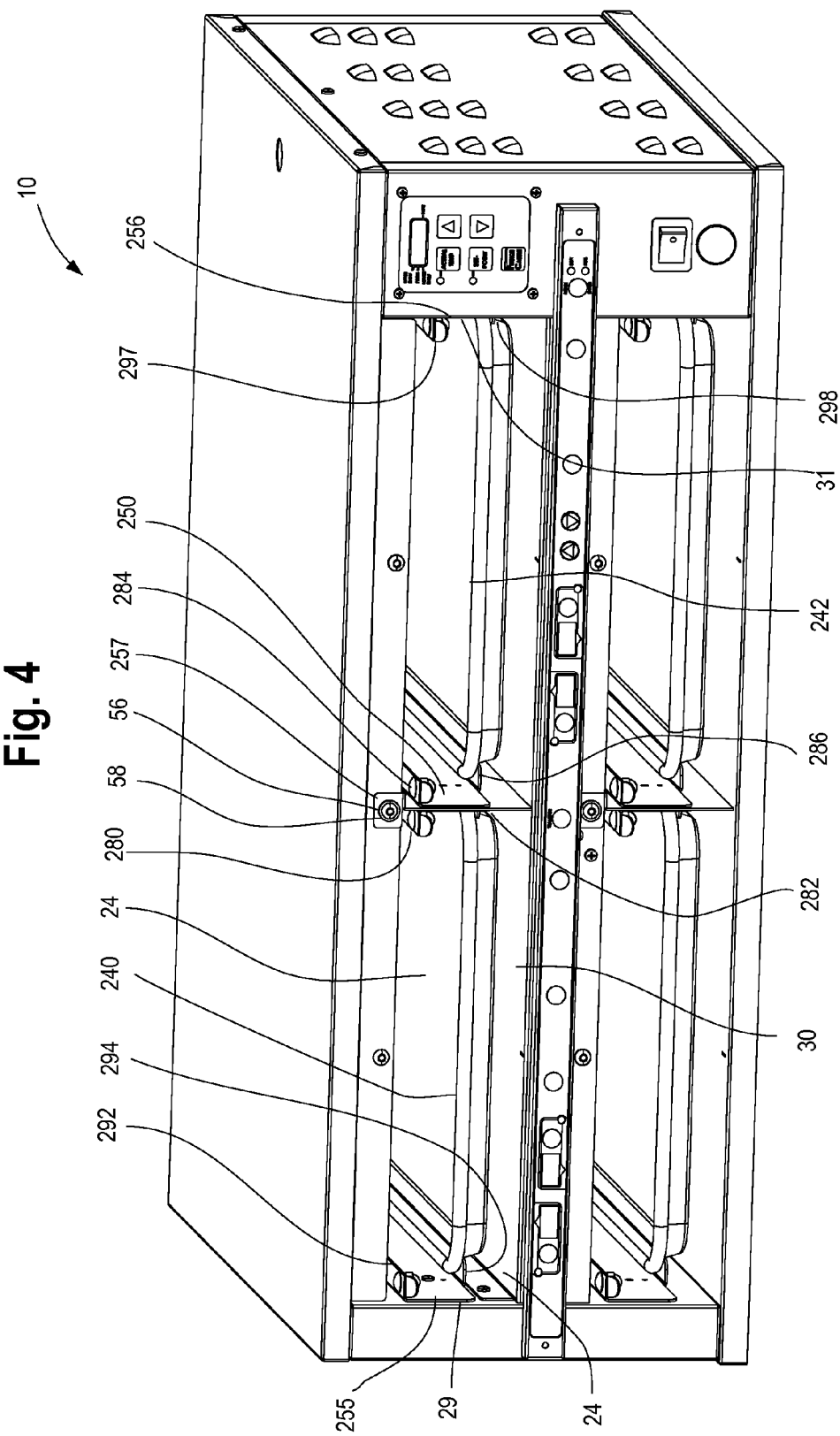
FIG. 4 is an isometric view of a food warming apparatus with one multi-level divider installed in each heating compartment and a shallow tray supported within each sub-compartment, in accordance with an exemplary embodiment.
Figure 5:
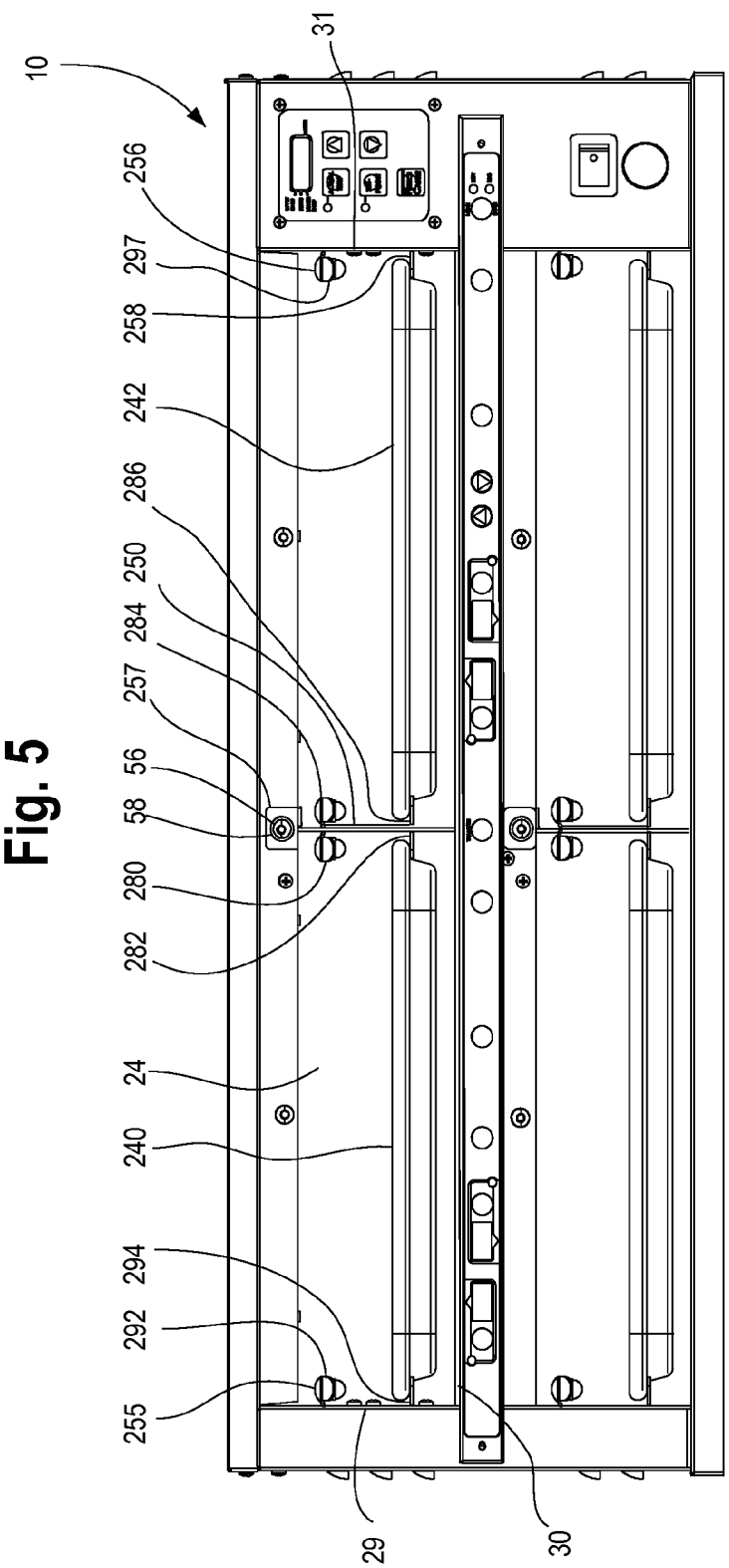
FIG. 5 is a front view of a food warming apparatus with one multi-level divider installed in each heating compartment and a shallow tray supported within each sub-compartment, in accordance with an exemplary embodiment.

A food warming device may be used with trays of different sizes, including trays of different widths and heights. FIG. 3 shows food warming apparatus 10 capable of holding trays of different widths, and therefore, different sizes in sub-compartments 264 and 266. FIGS. 4 and 5 show the exemplary food warming apparatus 10 with multi-level divider 250 and complementary supports 255 and 256 and shallow trays 240 and 242 within heating compartment 24. FIG. 4 shows shallow trays 240 and 242 without covers. For example, a shallow tray may hold previously cooked food portions, such as fried foods or breads like biscuits, that are maintained uncovered to prevent the previously cooked food portions from becoming soggy.

A multi-level divider may be removably mounted in a food warming apparatus as described above for a single-level divider. In the example illustrated in FIG. 4, multi-level divider 250 is mounted inside heating compartment 24 by mounting fastener 56 passing through mount 257 of multi-level divider 250 and through a hole at fixed mounting point 58 in cabinet 12 and then by securing mounting fastener 56 to cabinet 12.

Shallow trays may be supported in a variety of ways, such as by a support structure such as a divider and a complementary support. For example, FIG. 4 shows trays 240 and 242 in heating compartment 24 supported by a multi-level divider 250 and complementary supports 255 and 256.

In a preferred embodiment, the support flange of a divider may support a tray above the lower compartment surface. In a preferred embodiment, the complementary support flange of a complementary support may support a tray above the lower compartment surface or may cooperatively support a tray along with the support flange of the divider. As best seen in FIG. 5, shallow tray 240 is supported above lower compartment surface 30 by first lower support flange 282 of multi-level divider 250 and lower complementary support flange 294 of complementary support 255. FIG. 5 also shows shallow tray 242 supported above lower compartment surface 30 by second lower support flange 286 of multi-level divider 250 and lower complementary support flange 298 of complementary support 256. In alternative embodiments, trays may also be supported from below by resting on a support structure, such as a rack, or by resting on the lower compartment surface.

Complementary supports and dividers may be mounted inside the heating compartment in various ways. A complementary support may be mounted on the upper compartment surface, the lower compartment surface, or a side-wall of the heating compartment. FIG. 5 shows complementary support 255 mounted on first side-wall 29 of heating compartment 24 and complementary support 256 mounted on second side-wall 31 of heating compartment 24.

FIG. 6 illustrates single-level divider 50 with first support flange 53 and second support flange 54. A support flange may be fashioned with one or more protrusions. FIG. 6 illustrates divider 50 fashioned with protrusions 83 and 84 on first support flange 53 and protrusions 85 and 86 on second support flange 54. A protrusion may be any bump, bulge, post, knob, ridge, or similar projection on the support flange. A single-level divider may have one or more mounts for mounting the single-level divider on the cabinet. FIG. 6 shows single-level divider 50 with two mounts 57 that receive a mounting fastener. A mount may be a hole, aperature, notch, slot, gap, or other opening that receives a mounting fastener that may pass through the mount and removably mount the divider on the food warming apparatus.

An alternative mount is a clasp, clamp, hook, or other device on the divider that temporarily mounts the divider on the food warming apparatus to the cabinet or heating compartment surface along a ridge, bump, or other protrusion formed in the cabinet or heating compartment surface. A second alternative could be the use of a magnetic or electro-magnetic mount, where a magnet is provided either on the divider or on the food warming apparatus. The magnet could then attach to ferro-magnetic material in either the food warming apparatus, if the magnet is on the divider, or the divider, if the magnet is on the food warming apparatus.

Figure 7:
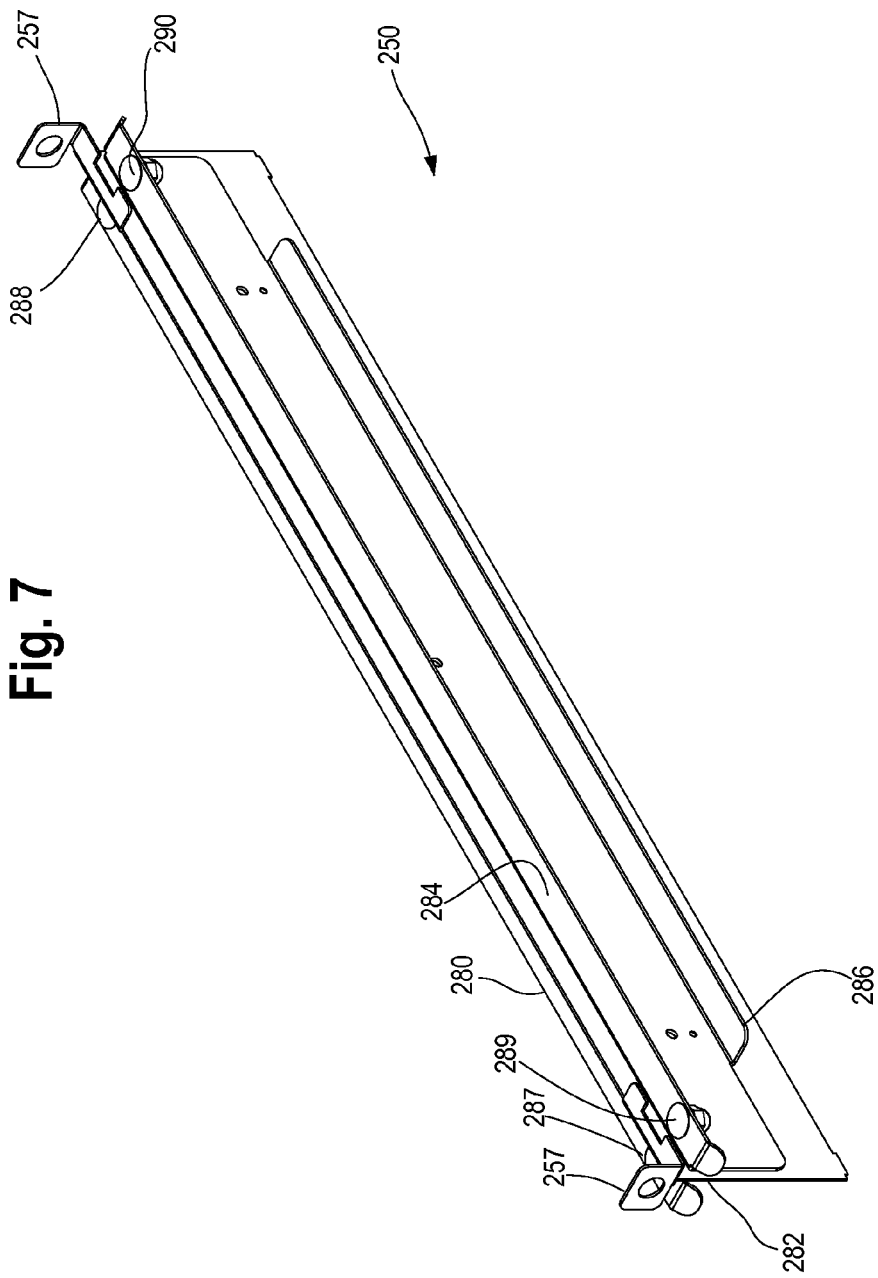
FIG. 7 is an isometric view of a multi-level divider, in accordance with an exemplary embodiment.

FIG. 7 illustrates multi-level divider 250 with support flanges 280, 282, 284, and 286. As with the single-level divider, one or more support flanges on the multi-level divider may be fashioned with protrusions. FIG. 7 illustrates support flange 280 fashioned with protrusions 287 and 288 and support flange 284 fashioned with protrusions 289 and 290. A multi-level divider may have one or more mounts for mounting the multi-level divider on the cabinet. FIG. 6 shows multi-level divider 250 with two mounts 257 that receive a mounting fastener. The alternative mounting mechanisms described above for a single-level divider apply as well to a multi-level divider.

Figure 8:
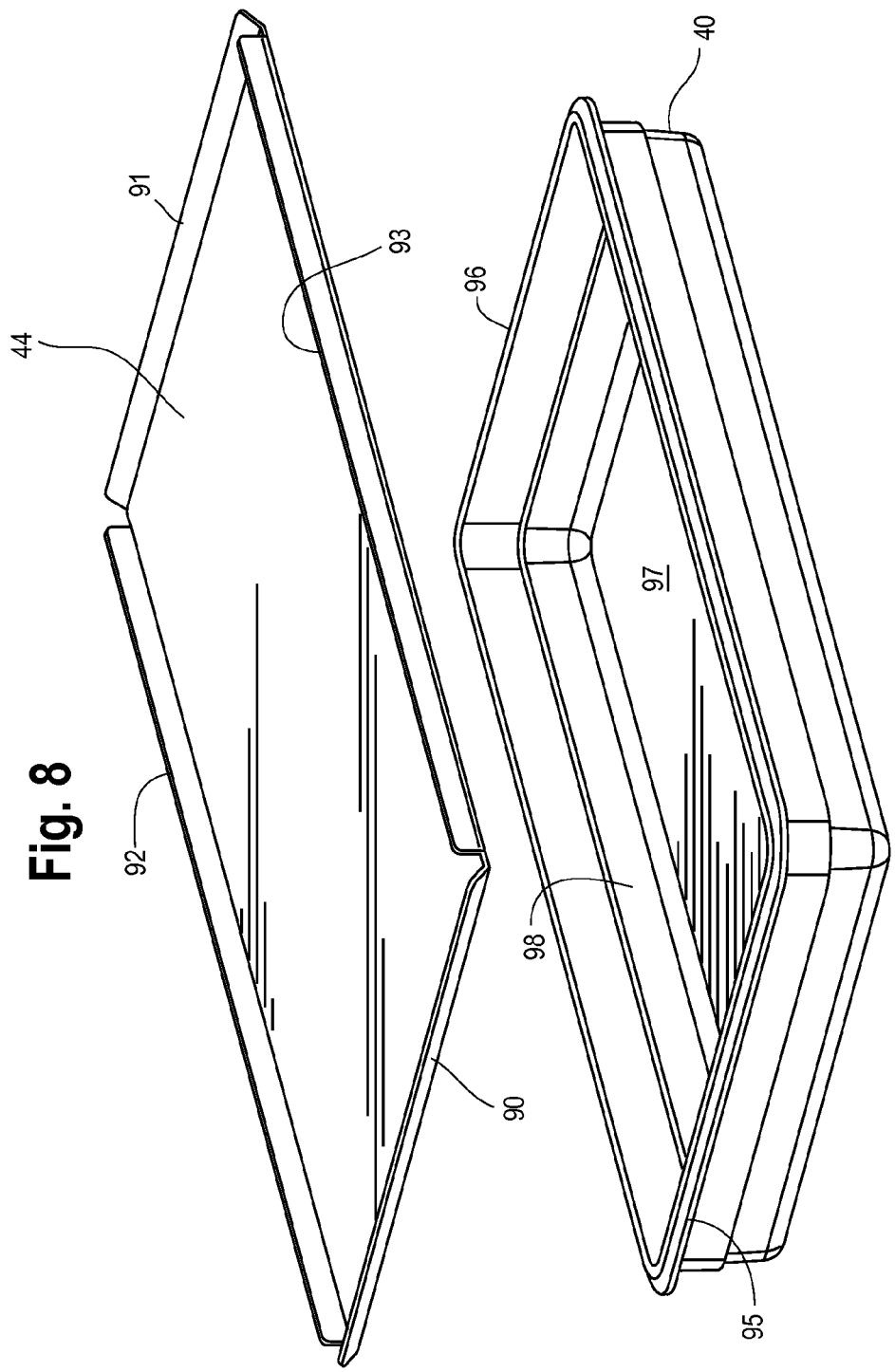
FIG. 8 is an isometric view of one tray and one cover, in accordance with an exemplary embodiment.

FIG. 8 depicts tray 40 and cover 44. In an exemplary embodiment, cover 44 is made out of a sheet material. The sheet material could be a metal, such as stainless steel, aluminum, or titanium, with a thickness ranging from about 0.024 inches to about 0.125 inches, depending on the type of metal. A metal cover could be anodized black or other color based, for example, on desired thermal characteristics. It is to be understood that cover 44 could also be made out of other materials, such as plastics (e.g., high temperature Nylon, polysulfone, polyimide, polyethersulfone, polyetherimide, or polyphenylene sulfide), depending on the operating temperatures that the covers experience.

To construct a cover out of a sheet material, a generally rectangular piece of the sheet material may be cut and the free edges of the sheet material may also be bent to provide additional stiffness. Cover 44 includes a front turned-up edge 90, a back turned-up edge 91, and side turned-up edges 92 and 93. Preferably, turned-up edges 90-93 do not contact upper compartment surface 28 when cover 44 is in heating compartment 24.

FIG. 8 also shows that rim 95 of tray 40 may surround a top opening 96 that provides access to the interior of tray 40. The interior of tray 40 defines a space that may be used to contain previously cooked food portions. The height of this interior space may be defined by the distance between a generally flat bottom wall 97 of tray 40 and the upper surface of rim 95. The sides of the interior space may be defined by four side walls 98 that extend between rim 95 and bottom wall 97.

Once inserted into a sub-compartment, the tray may rest in an internal position within a sub-compartment. FIG. 9 shows tray 40 resting on supplementary support 51 and first support flange 53 of single-level divider 50 in an internal position. The internal position may be a position where the tray is centered or nearly centered within the sub-compartment. When a tray rests in an internal position, the cover may at least partially block the top opening of the tray. FIG. 9 shows tray 40 the internal position, with cover 44 at least partially blocking top opening 96 of tray 40. In this position, cover 44 will restrict the evaporation of liquid from previously cooked food items contained in the interior of tray 40.

The internal position of the sub-compartment may be at least partially defined by one or more protrusions on the support flange of the divider. The internal position also may be at least partially defined by protrusions on the supplementary support. FIG. 9 shows the internal position defined by protrusions 83 and 84 on first support flange 53 of divider 50 and protrusions 87 and 88 on complementary support flange 55 of supplementary support 51.

A rim of a tray may be located between two protrusions on the support flange of the divider when the tray is at the internal position. Also, the rim of the tray may be located between two protrusions on the complementary support when the tray is at the internal position. When the rim is located between protrusions, the protrusions may hinder or arrest movement of the tray in or out of the compartment. Hindering or arresting movement of the tray may define the internal position for a user who may pull the tray out to access one or more previously cooked food portions in the tray and push the tray back into place; such as returning the tray to the internal position. As indicated in FIG. 9, when tray 40 is completely inserted into the sub-compartment 64 from the front, rim 95 of tray 40 engages protrusions 84 and 88. Protrusions 84 and 88 are marked, but are not visible in FIG. 9, as protrusions 84 and 88 are positioned toward the back of heating compartment 24. When rim 95 engages protrusions 84 and 88, the motion of tray 40 is arrested in an internal position. If the back of the food warming apparatus is open, a tray may be inserted from the back of the food warming apparatus. As best shown in FIG. 2, when tray 40 is completely inserted into the sub-compartment 64 from back 20, rim 95 of tray 40 engages protrusions 83 and 87. Once rim 95 engages protrusions 83 and 87, the motion of tray 40 is arrested in an internal position.

An engagement edge of a cover may engage a stop member when a tray is removed from a sub-compartment of a heating compartment. By engaging the engagement edge, a stop member may to arrest the movement of the cover caused by removal of a tray from the sub-compartment. By arresting the motion of the cover while a tray is withdrawn, the cover may be retained inside the sub-compartment. As best shown in FIG. 9, when tray 40 is withdrawn from sub-compartment 64 of heating compartment 24, front turned-up edge 90 of cover 64, acting as an engagement edge, engages stop member 61. The engagement of engagement edge 90 with stop member 61 arrests the movement of cover 44. As the movement of cover 44 is arrested, cover 44 is retained upon within sub-compartment 64 while tray 40 is withdrawn.

3. Exemplary Method of Use

As shown in FIG. 1, single-level divider 50 may be mounted inside heating compartment 24 of food warming apparatus 10 to divide heating compartment 24 into a first sub-compartment 64 and a second sub-compartment 66. Single-level divider 50 has a first support flange 53 extending into first sub-compartment 64 and a second support flange 54 extending into second sub-compartment 66. First support flange 53 is fashioned with protrusions 83 and 84 and second support flange 54 is fashioned with protrusions 85 and 86. As shown in FIG. 3, multi-level divider 250 may be mounted inside heating compartment 24 to divide heating compartment 24 into a first sub-compartment 251 and a second sub-compartment 254. Multi-level divider 250 has first upper support flange 280 and first lower support flange 282 extending into first sub-compartment 251 and second upper support flange 284 and second lower support flange 286 extending into second sub-compartment 254.

Cabinet 12 of food warming apparatus 10 may also comprise complementary support 51. Complementary support 51 may comprise a complementary support flange 55 that extends into first sub-compartment 64. Complementary support flange 55 is fashioned with protrusions 87 and 88.

Tray 40 may be inserted into first sub-compartment 64. Tray 40 may have a rim 95. Rim 95 may be supported by first support flange 53. First support flange 53 may support rim 95 of tray 40 so that tray 40 is suspended above lower compartment surface 30. Also, complementary support flange 55 may support rim 95 of tray 40 so that tray 40 is suspended above lower compartment surface 30. Further, first support flange 53 and complementary support flange 55 may cooperatively support rim 95 of tray 40.

A user may pull out tray 40 from first sub-compartment 64 to access tray 40, such as to add or remove previously cooked food portions from tray 40. After accessing tray 40, the user may then insert tray 40 into first sub-compartment 64. When a user inserts tray 40 into first sub-compartment 64 from the front of food warming apparatus 10, rim 95 of tray 40 may engage protrusions 84 on first support flange 53 and protrusion 88 on complementary support flange 55 to hinder or arrest movement of tray 40. Hindering or arresting the movement of tray 40 by protrusions 84 and 88 defines the internal position for a user inserting the tray 40 into the front of first sub-compartment 64. If the user were to insert tray 40 into first sub-compartment from the back of first sub-compartment 64, rim 95 of tray 40 may engage protrusion 83 on first support flange 53 and protrusion 87 on complementary support flange 55 to hinder or arrest movement of tray 40, thereby defining the internal position the user inserting tray 40 into the back of first sub-compartment 64.

A user may pull out tray 42 from second sub-compartment 66 to access tray 42, such as to add or remove previously cooked food portions from tray 42. After accessing tray 42, the user may then insert tray 42 into second sub-compartment 66. Tray 42 may have a rim. The rim of tray 42 may be supported by second support flange 54. Second support flange 54 may support the rim of tray 42 so that tray 42 is suspended above lower compartment surface 30. Also, a complementary support flange of complementary support 52 may support rim 95 of tray 40 so that tray 40 is suspended above lower compartment surface 30. Further, first support flange 53 and a complementary support flange of complementary support 52 may cooperatively support rim 95 of tray 40.

Cover 44 also may be supported by first support flange 53. Cover 44 may be supported by complementary support flange 55 as well. When tray 40 is inserted into first sub-compartment 64, rim 95 of tray 40 may be slid between cover 44 and first support flange 53. Also, rim 95 may be moved or slid between cover 44 and complementary support flange 51. Tray 40 may rest within first sub-compartment 64 in a position where top opening 96 is between first support flange 53 and complementary support flange 51 to allow cover 44 to at least partially block top opening 96 of tray 40. Rim 95 may come to rest between protrusions 83 and 84 of first support flange 53. Also, rim 95 may come to rest between protrusions 87 and 88 of complementary support flange 55.

4. Conclusion

While certain features and embodiments of the present invention have been described in detail herein, it is to be understood that the invention encompasses all modifications and enhancements within the scope and spirit of the following claims.

What is claimed is:

1. A food warming apparatus for maintaining previously cooked food portions contained in a plurality of trays in a ready-to-use condition, said plurality of trays including a first tray having a first rim extending outwardly from a first tray opening and a second tray having a second rim extending outwardly from a second tray opening, said food warming apparatus comprising:
 a cabinet having at least one heating compartment therein, said at least one heating compartment having an upper compartment surface, a lower compartment surface, a first side-wall and a second side-wall;
 at least one divider removably mounted in said at least one heating compartment, said at least one divider dividing said at least one heating compartment into at least a first sub-compartment and a second sub-compartment;
 a first support flange disposed on said at least one divider for supporting said first rim of said first tray in said first sub-compartment such that said first tray is suspended above said lower compartment surface, said first support flange including first and second first-flange protrusions that define a first-tray internal position in which said first rim rests on said first support flange between said first and second first-flange protrusions; and
 a second support flange disposed on said at least one divider for supporting said second rim of said second tray in said second sub-compartment such that said second tray is suspended above said lower compartment surface, said second support flange including first and second second-flange protrusions that define a second-tray internal position in which said second rim rests on said second support flange between said first and second second-flange protrusions.

2. The food warming apparatus of claim 1, further comprising:
 a first complementary support flange for supporting said first rim of said first tray in said first sub-compartment in cooperation with said first support flange; and
 a second complementary support flange for supporting said second rim of said second tray in said second sub-compartment in cooperation with said second support flange.

3. The food warming apparatus of claim 2, further comprising a cover disposed in said first sub-compartment between said first support flange and said upper compartment surface.

4. The food warming apparatus of claim 3, wherein said cover is movably supported on said first support flange and said first complementary support flange such that said first rim of said first tray can be inserted between said cover and said support flanges to allow said first tray to reach said first-tray internal position within said first sub-compartment.

5. The food warming apparatus of claim 4, wherein in said first-tray internal position said cover at least partially blocks said first tray opening so as to restrict evaporation of liquid from said previously cooked food portions contained in said first tray.

6. The food warming apparatus of claim 5, further comprising at least one stop member removably mounted on said cabinet.

7. The food warming apparatus of claim 6, wherein said cover comprises at least one engagement edge for engaging said at least one stop member, such that said at least one stop member arrests movement of said cover caused by removal of said first tray from said first sub-compartment.

8. The food warming apparatus of claim 2, further comprising:
 first and second complementary protrusions on said first complementary support flange.

9. The food warming apparatus of claim 8, wherein in said first-tray internal position, said first rim rests on said first support flange between said first and second first-flange protrusions and said first rim rests on said first complementary support flange between first and second complementary protrusions.

10. The food warming apparatus of claim 1, wherein said plurality of trays includes a third tray having a third rim extending outwardly from a third tray opening, said third tray being shallower than said first tray, further comprising at least one lower support flange disposed on said at least one divider for supporting said third rim of said third tray in said first sub-compartment, wherein said lower support flange is below said first support flange.

11. The food warming apparatus of claim 2, wherein said first complementary support flange is disposed on said first side-wall and said second complementary support is disposed on said second side-wall.

12. The food warming apparatus of claim 2, wherein said first complementary support flange is disposed on said first side-wall and said second complementary support is disposed on said at least one divider.

13. The food warming apparatus of claim 12, wherein said first sub-compartment is larger than said second sub-compartment.

14. The food warming apparatus of claim 3, wherein said cover is metal.

15. The food warming apparatus of claim 1, further comprising at least one heater plate for heating said at least one heating compartment.

16. A method for using a plurality of trays in a food warming apparatus, said plurality of trays including a first tray having a first rim extending outwardly from a first tray opening and a second tray having a second rim extending outwardly from a second tray opening, said food warming apparatus including a heating compartment, said heating compartment having a lower compartment surface and an upper compartment surface, said method comprising:

removably mounting a divider inside said heating compartment such that said heating compartment is divided into at least a first sub-compartment and a second sub-compartment, said divider including a first support flange extending into said first sub-compartment and a second support flange extending into said second sub-compartment, said first support flange including first and second first-flange protrusions, said second support flange including first and second second-flange protrusions;

inserting a first tray into said first sub-compartment such that said first rim is supported by said first support flange between said first and second first-flange protrusions and said first tray is suspended above said lower compartment surface; and inserting a second tray into said second sub-compartment such that said second rim is supported by said second support flange between said first and second second-flange protrusions and said second tray is suspended above said lower compartment surface.

17. The method of claim 16, further comprising:

supporting a cover in said first sub-compartment such that said cover rests on said first support flange.

18. The method of claim 17, wherein inserting a first tray into said first sub-compartment comprises:

sliding said first rim between said cover and said first support flange until said cover at least partially blocks said first tray opening.

19. The method of claim 18, wherein sliding said first rim between said cover and said first support flange further comprises:

sliding said first rim until said first rim rests between said first and second first-flange protrusions.

20. The method of claim 16, wherein said food warming apparatus further comprises a first complementary support flange, and wherein inserting a first tray into said first sub-compartment further comprises:

supporting said first rim by said first support flange and said first complementary support flange such that said first tray opening is between said first support flange and said first complementary support flange.

\* \* \* \* \*